June 3, 1941.  H. H. KEEN  2,244,252
PAPER SPACING MECHANISM FOR PRINTING MACHINES
Filed April 15, 1938  8 Sheets-Sheet 1

INVENTOR
Harold H. Keen
BY
Wm Wilson
ATTORNEY

June 3, 1941.  H. H. KEEN  2,244,252
PAPER SPACING MECHANISM FOR PRINTING MACHINES
Filed April 15, 1938  8 Sheets-Sheet 4

INVENTOR
Harold H. Keen
BY
W. M. Wilson
ATTORNEY

June 3, 1941.  H. H. KEEN  2,244,252

PAPER SPACING MECHANISM FOR PRINTING MACHINES

Filed April 15, 1938  8 Sheets-Sheet 5

INVENTOR
Harold H. Keen
BY
W. M. Wilson
ATTORNEY

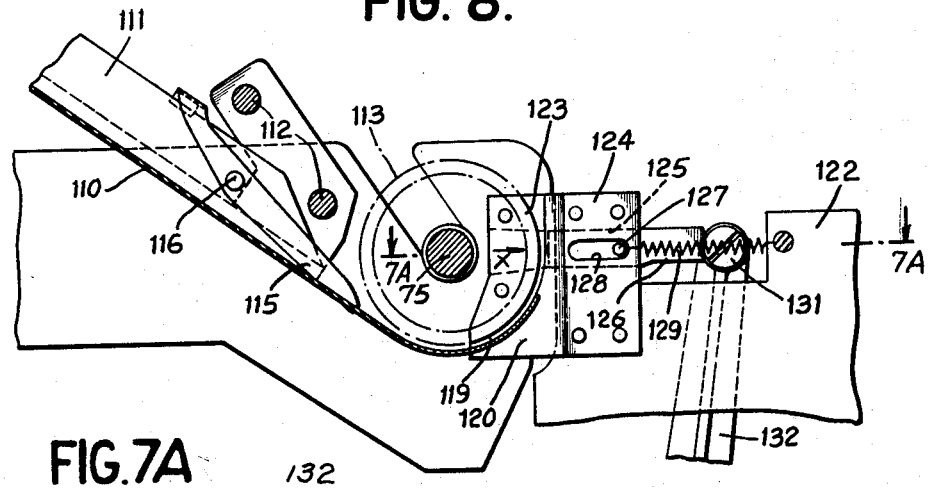
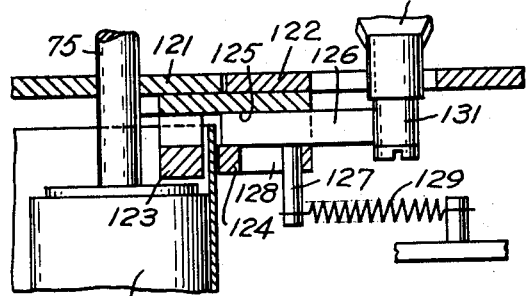
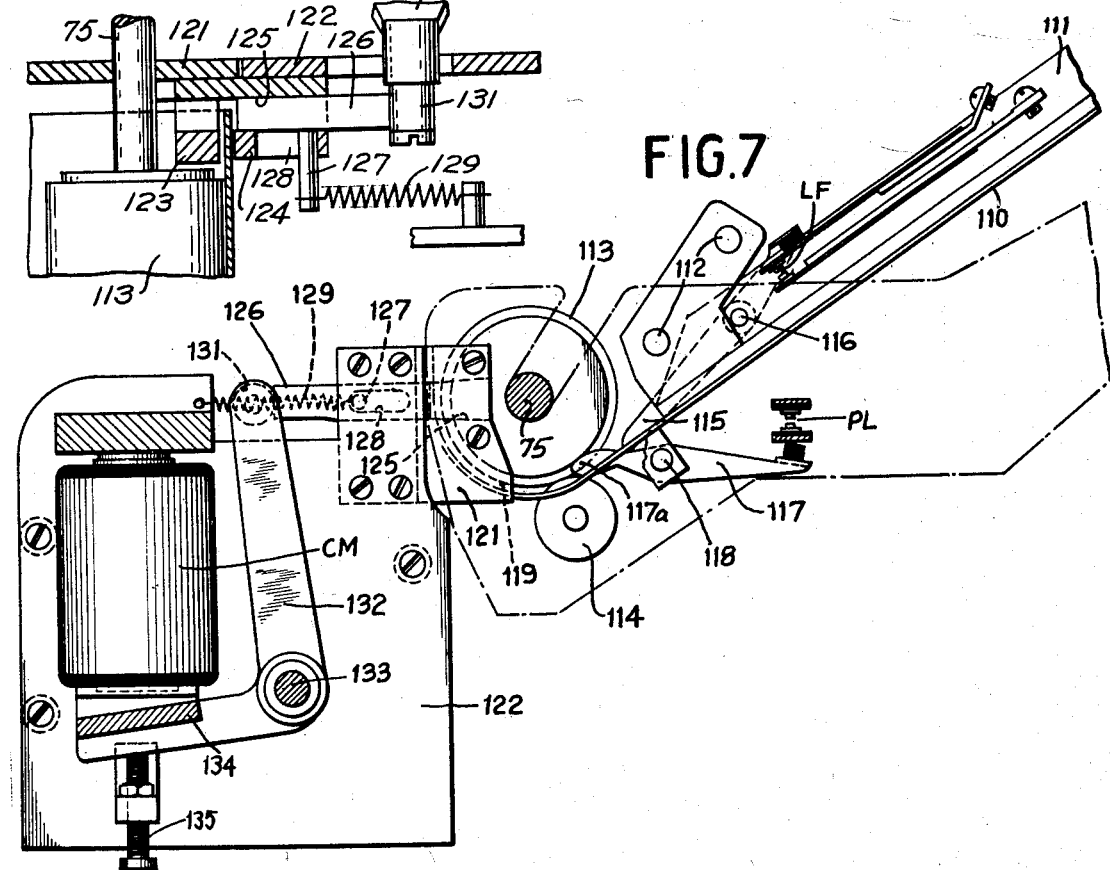

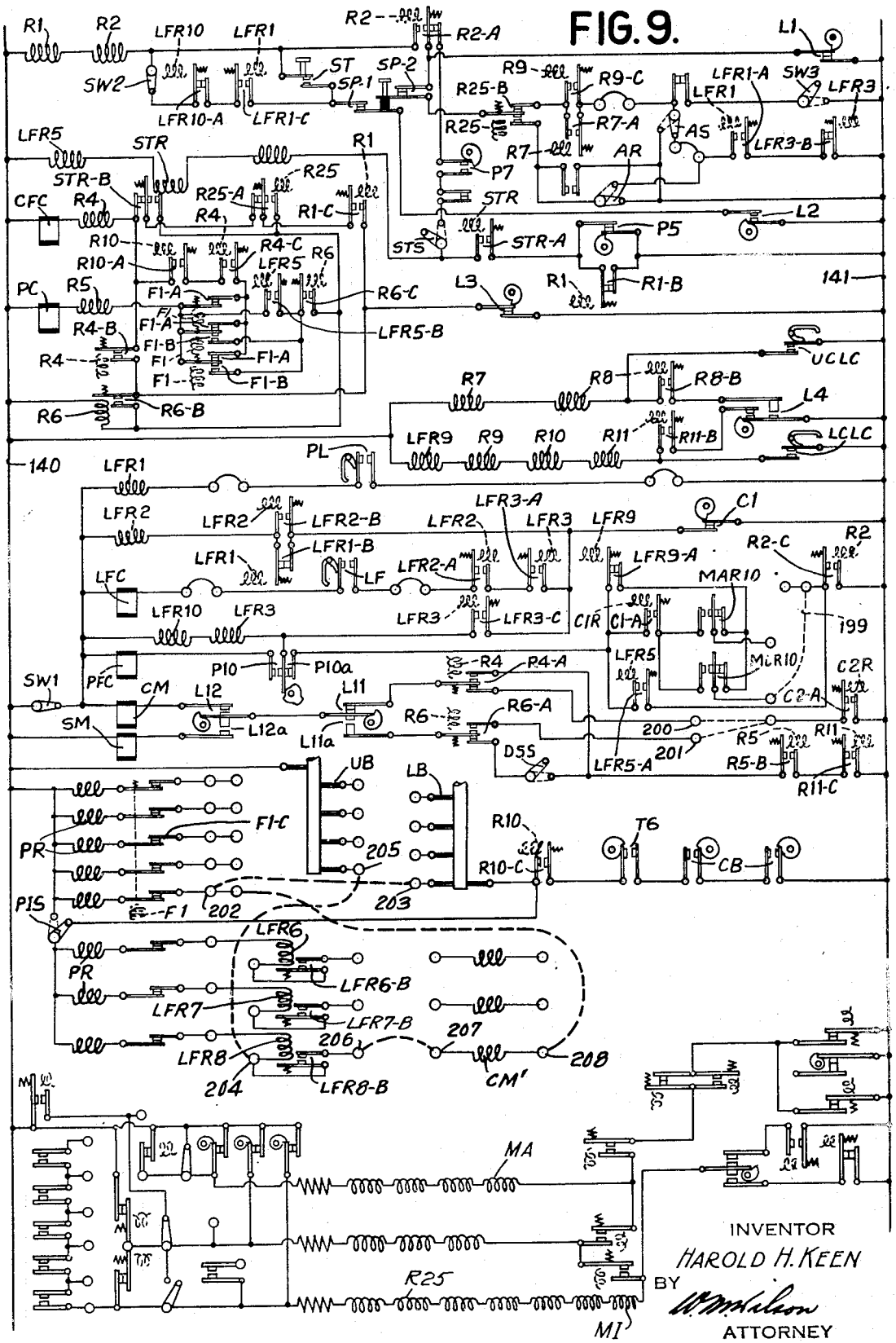

June 3, 1941.  H. H. KEEN  2,244,252
PAPER SPACING MECHANISM FOR PRINTING MACHINES
Filed April 15, 1938  8 Sheets-Sheet 8
FIG. 10.
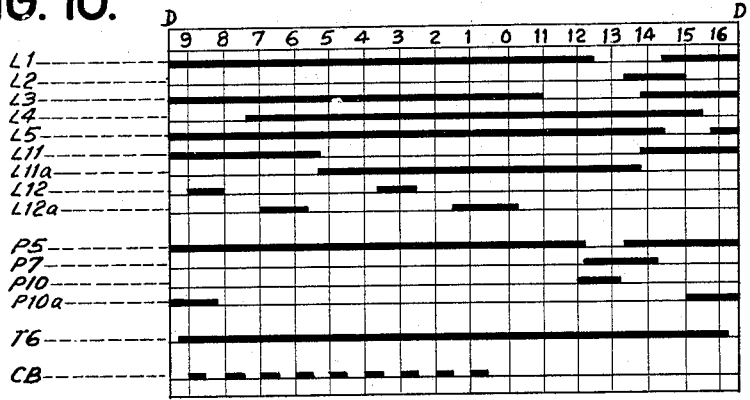
FIG. 11.
|  | A.B.C.D. LTD. | | | | ACCOUNT NO. 4 | |
|---|---|---|---|---|---|---|
|  | 9. LONDON Rd. | | | | | |
| NEXT A/C INDICATION | ACCOUNT NO. | DOCUMENT NO. | DAY M'TH | AMOUNT | TOTAL | |
| 32 | 4 | 3790 | 1.1 | 18.6 | 18.6x | |
| 4 | 4 | 3900 | 13.1 | 5.0 | | |
| 26 | 4 | 3900 | 13.1 | 1.18.0 | 3. 1.6x | |
| 29 | 4 | 4162 | 15.1 | 3. 0.0 | 6. 1.6x | |
FIG. 12.
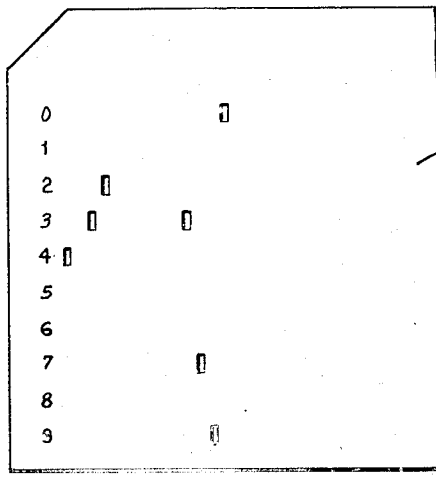
INVENTOR
Harold H. Keen
BY
W. M. Wilson
ATTORNEY Patented June 3, 1941

2,244,252

UNITED STATES PATENT OFFICE 2,244,252

PAPER SPACING MECHANISM FOR PRINTING MACHINES

Harold Hall Keen, Letchworth, England, assignor to International Business Machines Corporation, New York, N. Y., a corporation of New York Application April 15, 1938, Serial No. 202,220 In Great Britain April 26, 1937

8 Claims. (Cl. 197—127)

This invention relates to paper-feeding mechanism for feeding a sheet of paper to the printing mechanism of calculating, accounting and like machines.

The invention is concerned with paper-feeding mechanism of the kind comprising a platen or other rotary feeding member (hereinafter referred to as the platen), line-spacing mechanism, including a ratchet wheel connected to the platen to drive it and an associated feed pawl, for rotating the platen a line-space between the printing of successive lines on the sheet and long-feed mechanism, including a disengageable coupling controlled by an indication detecting device, for rotating the platen through a plurality of steps. The indication detecting device is arranged to detect indicia or an indication on a sheet of the position of the line on that sheet at which printing is to commence and operates when it detects such indication, to disengage the coupling so that the drive to the platen is interrupted and the latter stops with the said line at the printing position.

Sheet-feeding mechanism of this kind is employed when it is desired to print on a plurality of separate sheets which already contain a variable number of printed lines and the indication then indicates the position of the highest blank line. Mechanism of this kind may also be employed to feed a long sheet which is subsequently to be divided into forms and has pre-printed headings on each form. Such a sheet has an indication on each form of the top line on that form and the long-feed mechanism operates to feed the sheet from the last printed line of one form to the top line of the next form.

In either case the required line is brought to the printing position by the operation of the long-feed mechanism. Since slippage may occur between the platen and the sheet, the position in which the platen comes to rest, when the required line is at the printing position, is indeterminate. The present practice is to connect the line-spacing ratchet wheel to the platen so that they rotate together and it is found that the platen comes frequently to rest in a position in which the ratchet wheel is in an abnormal position with respect to its pawl, so that the latter will feed the platen half a line-space or one and a half line-spaces by engaging a tooth too late or too early in its stroke.

According to the present invention, sheet-feeding mechanism of the above kind comprises an epicyclic gear, of which one member is connected to the platen to rotate therewith, the second member is connected to the ratchet wheel to rotate therewith and the third member is arranged to be driven by the long-feed mechanism, and a brake arranged to brake the third member during line-spacing operations.

With this arrangement the long-feed mechanism when operative, tends to drive the platen forwardly and the ratchet-wheel backwardly. Rotation of the ratchet-wheel backwardly is prevented by the pawl or a separate detent so that the platen turns forwardly while the ratchet-wheel is held in its normal position. This ensures that the line-spacing operation following a long-feed of the sheet will produce a normal line-spacing feed of the sheet. The third primary member is held during line-spacing so that the ratchet-wheel can drive the platen forwardly.

According to a feature of this invention the brake is arranged to act continuously so that the platen is brought rapidly to rest when the coupling is disengaged. The coupling may be constituted by an epicyclic gear of which two primary members constitute driving and driven members and means for arresting or releasing the third primary member of the gear to engage or disengage the coupling.

According to another feature of this invention there is provided a rotatable cam operable to disengage the coupling at a fixed point in its movement and a one-revolution clutch through which the cam is driven and which is engaged by the indication detecting means when it detects an indication on the sheet.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

In the drawings:

Fig. 3A is a partial sectional view taken on the line 3A—3A in Fig. 1 and showing the line space ratchet wheel and the operating pawl;

Figure 7 is a section on the line 7—7 of Figure 2, and shows the punching mechanism in side elevation;

Figure 7A is a sectional plan view taken along the line 7A—7A in Figure 8 and showing the sheet perforating devices.

Figure 8 is a section on the line 8—8 of Figure 2;

Figure 9 is a circuit diagram for the mechanism;

Figure 10 is a timing diagram showing the timing of the contact devices shown in Figure 9;

Figure 11 shows a ledger sheet for use in the machine, and

Figure 12 shows a portion of a perforated card of the kind used to control the printing operation of the machine.

Figure 1:
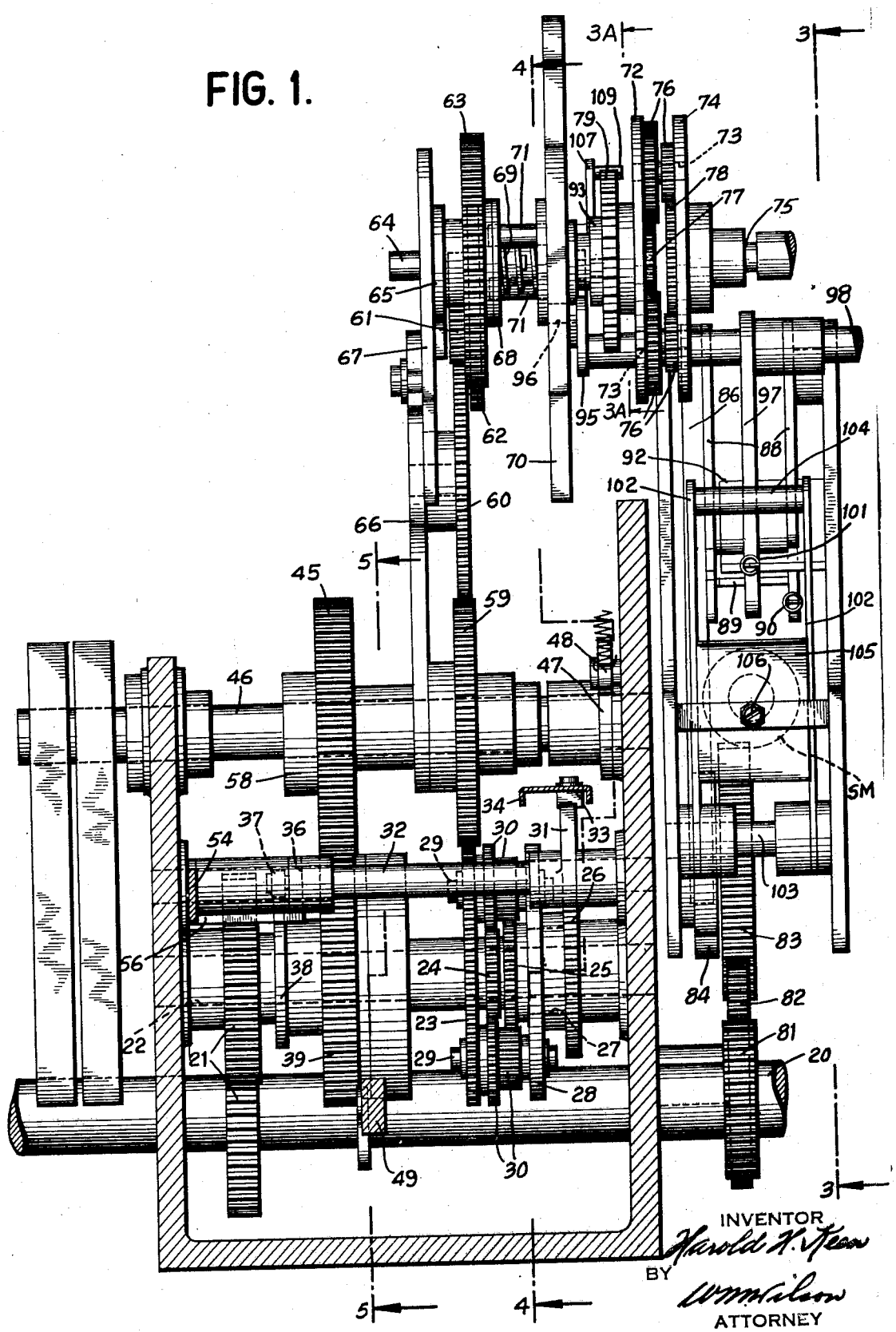
Figure 1 is a front elevation at the left-hand end of a platen showing a long-feed mechanism and a line-spacing mechanism for driving the platen.

The construction illustrated in the drawings is intended for use in feeding ledger sheets to a tabulating machine which automatically makes entries from cards on the ledger sheets. A card 12a (Fig. 12) is prepared for each transaction that occurs, and, periodically, the ledger sheets relating to accounts on which transactions have occurred are collected together and arranged in the order of the account numbers. The cards relating to the transactions are also sorted into a similar order and are passed through a tabulating machine which is arranged to stop after the card or group of cards relating to a particular account has been read. When the machine stops, the operator inserts the next ledger sheet which is fed automatically into position with the first blank line at the printing position. The machine then proceeds to print from the card or group of cards corresponding to that ledger sheet at the completion of which the ledger sheet is ejected.

Each ledger sheet will contain an indefinite number of lines of print and, for each line on which printing is effected in the tabulating machine, a rectangular portion is cut from one margin of the sheet so as to form a step 19 (Figure 11) in this margin. As printing is effected line by line on the sheet, the step 19 moves down the margin so as always to remain level with the first blank line on the sheet. This step constitutes an indication of the first blank line and controls the feeding of the sheet by means of a long-feed mechanism to bring the first blank line to the printing position.

The present construction will be described as applied to a machine of the kind shown in U. S. Patent 2,174,699, application Serial No. 731,459, filed June 20, 1934 and British patent specification No. 422,135 known commercially as the "Hollerith total rolling tabulator."

Figure 4:
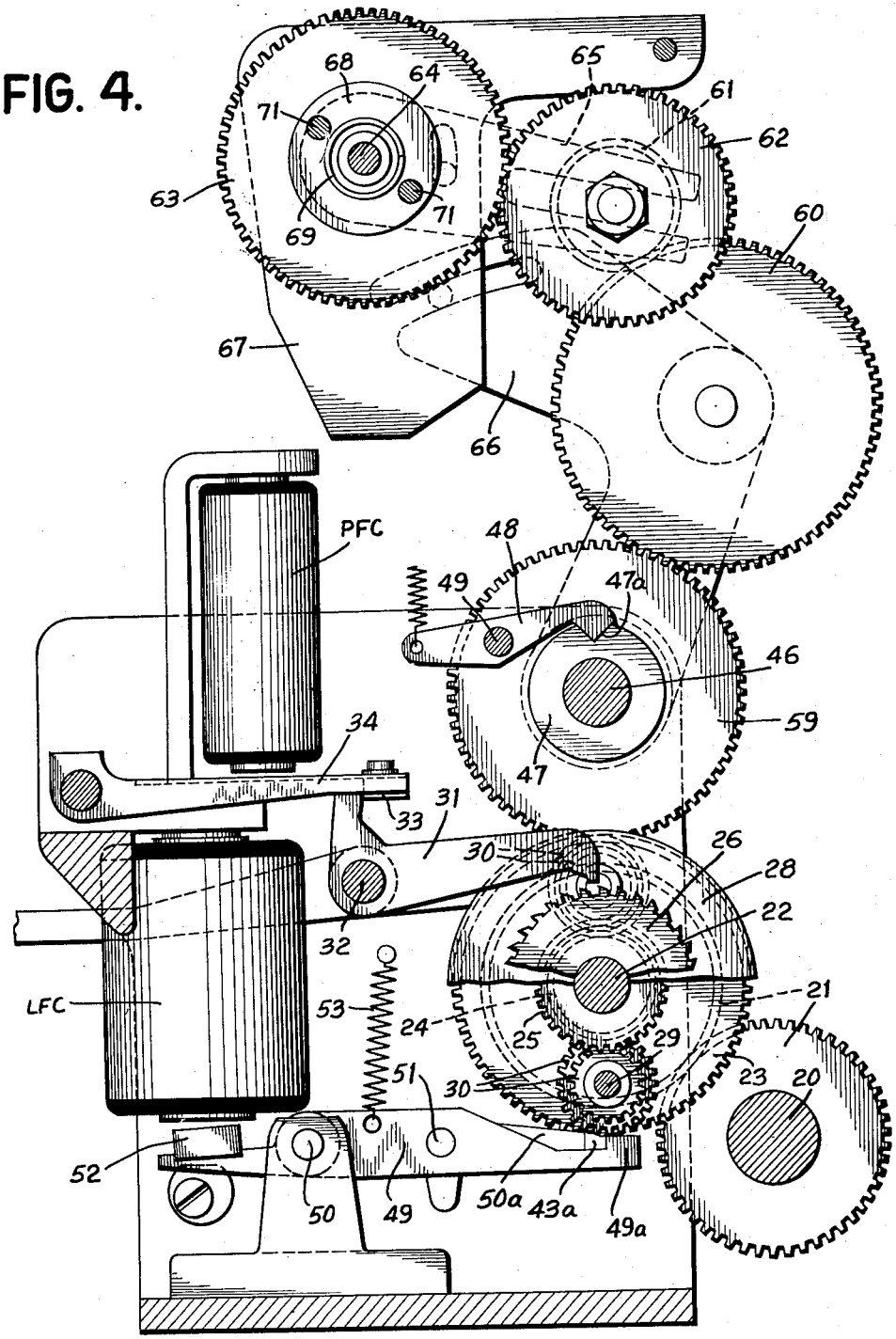
Figure 4 is a section on the line 4—4 of Figure 1, and shows the long-feed mechanism in side elevation.

The machine is driven by a tabulating motor, not shown, and includes a shaft 20 (Figure 1) which is driven continuously. This shaft 20, through gear-wheels 21, drives a drive shaft 22 of the long-feed mechanism. A driving gear-wheel 23 (Figures 1 and 4) is rotatable on the shaft 22 and can be connected to it by a coupling constituted by an epicyclic gear. This epi-cyclic gear comprises a sun-wheel 24 which is secured to the drive shaft 22 and a sun-wheel 25 which is rotatable on the shaft 22 and is secured to a ratchet-wheel 26 by a sleeve 27. A disc 28 is rotatable on the sleeve 27 and is secured to the gear-wheel 23 by spindles 29, the assembly comprising the gear-wheel 23, the disc 28, and the spindles 29 constituting a planet carrier. Compound planet-wheels 30 are rotatable on the spindles 29 and mesh with the sun-wheels 24 and 25. A stop pawl 31 (Figure 4) is secured on a rockable spindle 32 and is normally latched away from the ratchet-wheel 26 by a projection 33 on the armature 34 of a feed coupling magnet PFC. Thus, the ratchet-wheel 26 and the sun-wheel 25 are normally free to rotate and no torque can be transmitted through the epicyclic gearing to the driving wheel 23. A spring 35 is connected to an arm 36 (Fig. 5) which is also secured on spindle 32 so that the arm 36 and stop pawl 31 rock together. When the magnet PFC is energized, it releases the pawl 31 and the stop pawl is moved by the spring 35 (Figure 5) to engage and arrest the ratchet-wheel 26 and the sun-wheel 25. The driving wheel 23 is then connected to the drive shaft 22 through the sun-wheel 24 and the planet-wheels 30.

Figure 6:
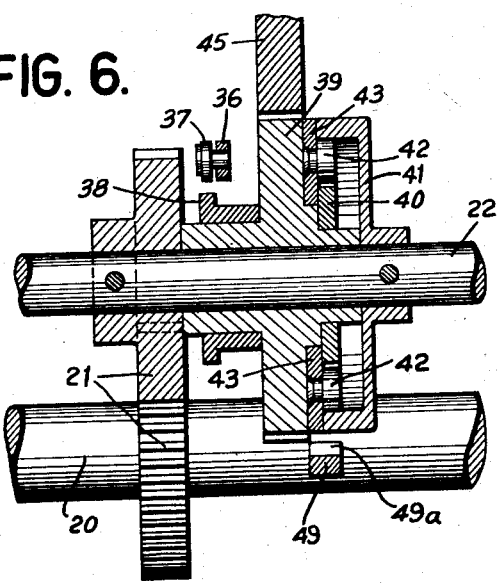
Figure 6 is a section on the line 6—6 of Figure 5.
Figure 5:
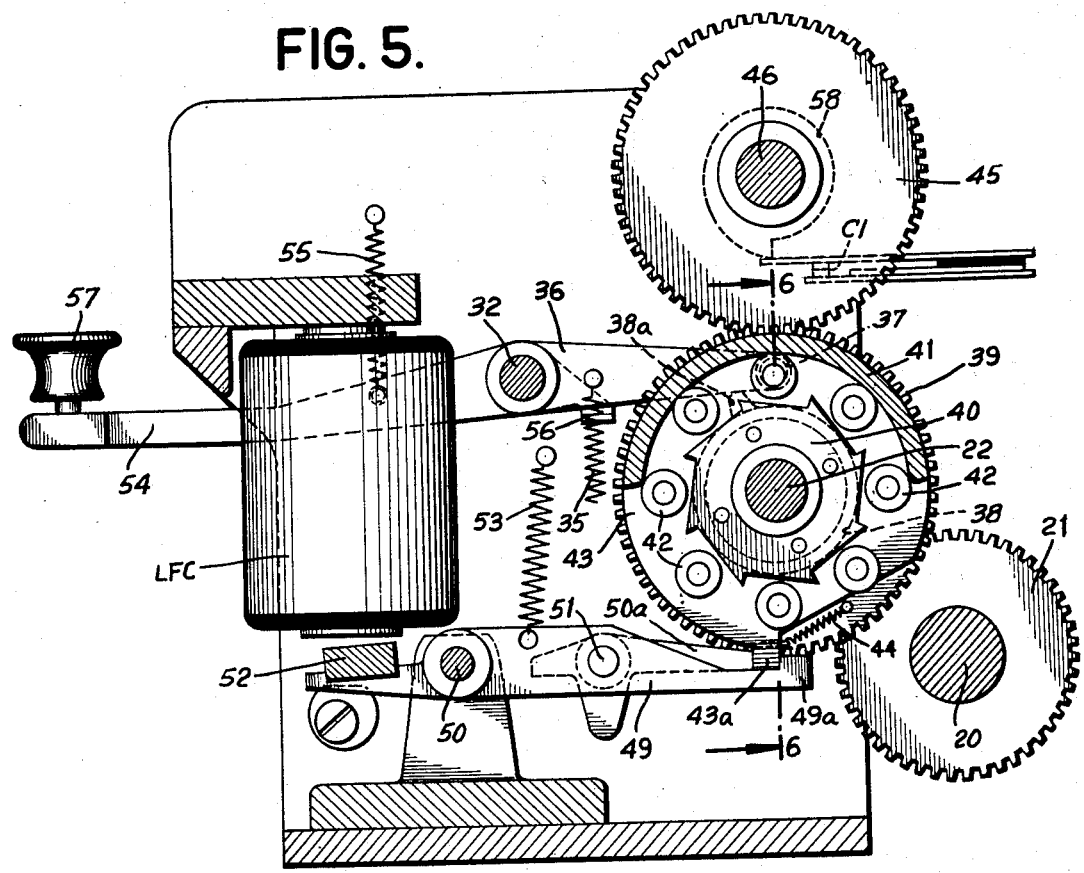
Figure 5 is a section on the line 5—5 of Figure 1, and shows means for ending a long-feed operation.

The arm 36 carries a roller 37 engaging a cam 38 having a single rise 38a (Figure 5). The cam 38 is rotatable on the drive shaft 22 and is secured to a gear-wheel 39 which may be coupled to the drive shaft 22 by a clutch of the roller type. This clutch comprises a cam plate 40 (Figures 5 and 6) which is secured to the gear-wheel 39 and a drum 41 which is secured to the shaft 22. As shown in Figure 5 the cam plate 40 has a series of flats which provide, with the inner surface of the drum 41, a series of tapering spaces. A roller 42 is mounted in each of these spaces and these rollers are rotatably carried by a roller plate 43 which is mounted on the hub of the gear-wheel 39 so that it can rock relatively to the gear-wheel. A spring 44 biases the roller plate 43 to move counter-clockwise (Figure 5) relatively to the cam plate 40 so as to move the rollers into the narrow portions of the spaces where they wedge the cam plate 40 and the drum 41 together to transmit the drive from the shaft 22 to the gear-wheel 39.

The gear-wheel 39 meshes with a gear-wheel 45 which is secured on a shaft 46. A disc 47 (Figure 4) is also secured on the shaft 46 and is formed with a notch 47a which is normally engaged by the nose of a spring-biased pawl 48. The pawl 48 is pivoted at 49 on a frame of the machine and serves to hold the shaft 46, and therefore the gear-wheels 45 and 39, in a definite position. Consequently, the cam plate 40 is normally held in the position shown in Figure 5. The roller plate 43 is provided with a projection 43a (Figure 5) which normally engages the nose 49a of a lever 49 which is pivoted at 50. The roller plate is thus held by the lever 49 in such a position that the rollers 42 are in the widest part of the spaces between the cam plate 40 and the drum 41. Thus, normally no drive is transmitted through this roller clutch. A spring-pressed dog 50a is pivoted at 51 on the lever 49 and snaps behind the projection 43a so that the roller disc 43 is positively held against movement in both directions. The lever 49 carries an armature 52 of a line-finding clutch magnet LFC. When the magnet LFC is energized, it rocks the lever 49 clockwise so that the nose 49a moves clear of the lug 43a and the roller disc 43 is released. The spring 44 then rocks the roller disc 43 relatively to the cam disc 40 to engage the roller clutch as described above. The cam 38 then turns through one revolution at the end of which the roller disc 43 is again held by the nose 49a engaging the projection 43a, the magnet LFC having been de-energized. A spring 53 biases the lever 49 to rock counter-clockwise. As the cam 38 nears its normal position, the cam rise 38a engages the roller 37 and rocks the lever 36 and the spindle 32. Consequently, the stop pawl 31 (Figure 4), which is secured on the spindle 32, is rocked counterclockwise away from the ratchet wheel 26 and is re-latched by the projection 33 on the armature 34. The drive from the drive shaft 22 to the driving gear 23 is thus interrupted.

It will be noted that the energization of the magnet LFC results in the drive to the driving gear 23 being interrupted, but this interruption occurs a short time after the magnet was energized, and during this time the driving gear 23 turns through a constant angle which is nearly one revolution. The reason for this will be explained later.

A key lever 54 is pivoted on the shaft 32 and is held upwardly by a spring 55 against a suitable stop (not shown). The lever 54 has a lug 56 which extends under the arm 36. The long-feeding operation can be stopped at any time by depressing a key 57 on the end of the lever 54 so as to rock the lever and move the lug 56 upwardly. This rocks the arm 36 and the connected pawl 31 upwardly to interrupt a long-feeding operation in the manner previously described.

The gear-wheel 45 carries a cam 58 which operates a pair of contacts C1 shown in the circuit diagram. The function of these contacts will be explained later, but it will be observed that the cam 58 only rotates while the roller clutch is engaged.

The driving gear-wheel 23 drives a gear-wheel 59 (Figures 1 and 4), which is rotatable on the shaft 46 and which in turn drives a gear-wheel 60. The gear-wheel 60 drives a gear-wheel 61, which is secured to a gear-wheel 62. The gear-wheel 62 drives a driving gear-wheel 63 which is secured on a driving shaft 64. In order to allow for variation in the gear ratio between the shaft 22 and 64, the gear-wheels 61 and 62 are mounted in a slot in an arm 65 which is pivoted on the shaft 64. The gear-wheels 61 and 62 can thus be removed and replaced by others of different diameter. The gear-wheel 60 is carried by an arm 66 which is pivoted on the shaft 46 so that its centre can be adjusted to suit the gear-wheels 61 and 62 employed. In this manner the amount of movement imparted to the shaft 64 between the energization of the magnet LFC (Figure 5) and the actual interruption of the long-feeding operation can be adjusted. The gear-wheel 63 is prevented from axial movement to the left (Figure 1) by the hub of the arm 65, which, in turn, is held against movement to the left by a fixed frame 67. A friction disc 68 is pressed against the right-hand face (Figure 1) of the gear-wheel 63 by a spring 69 which is compressed between the disc 68 and a fixed frame member 70. Two pins 71 are secured to the frame member 70 and fit into holes in the disc 68 so as to hold the disc 68 against rotation. This disc 68 thus acts as a brake on rotation of the gear-wheel 63 so that this gear-wheel and the shaft 64 will be brought rapidly to rest as soon as the drive to them is interrupted. The brake also serves to hold the shaft 64 stationary during line-spacing operations.

A disc 72 is loosely and rotatably mounted near the right-hand end of the shaft 64 and is connected by two spindles 73 to a second disc 74 which is rotatable on the platen shaft 75. The assembly 72, 73, 74 constitutes the planet carrier of the second epicyclic gear, and compound planet-wheels 76 mesh with a sun-wheel 77 secured to the right-hand end of shaft 64 and a sun-wheel 78 secured to the left-hand end of platen shaft 75. The disc 72 is secured to a ratchet-wheel 79 (Figure 3) which is held against rotation in a counter-clockwise direction by a line-spacing pawl 80. The shaft 64 is always driven clockwise and tends to rotate the shaft 75 clockwise and the planet carrier and the ratchet wheel 79 counterclockwise. Since the ratchet-wheel 79 cannot turn counter-clockwise, the platen shaft 75 will be rotated clockwise at a relatively high speed. The platen is secured on the shaft and serves to feed the ledger sheet until the first blank line is at printing position and also to eject the ledger sheet.

It will be seen from the foregoing that a long-feed operation can be initiated by energizing the magnet PFC and the platen will continue to turn until the magnet LFC is energized. The platen will turn to a predetermined extent after the magnet LFC has been energized and will then come to rest.

Figure 3:
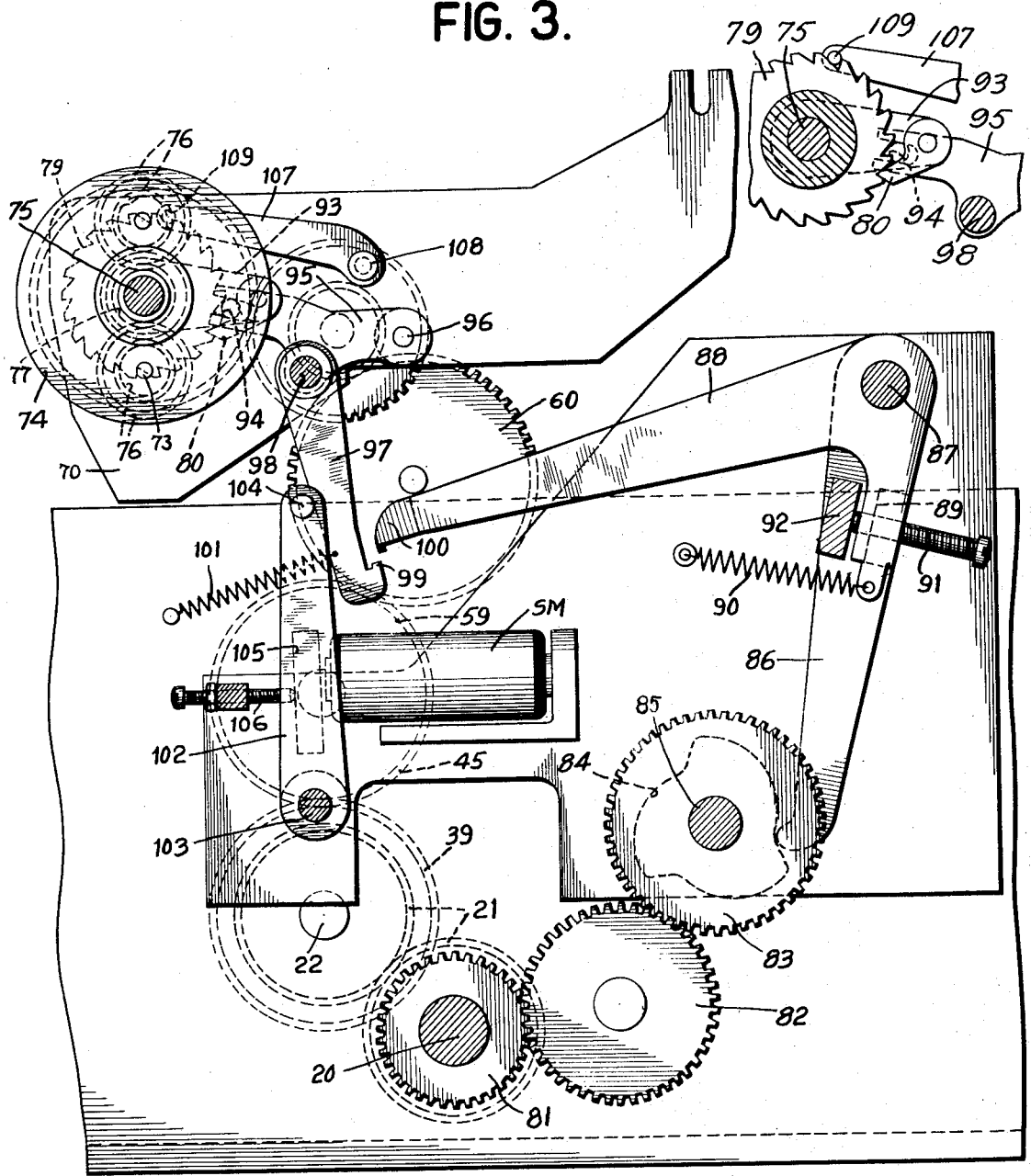
Figure 3 is a section on the line 3—3 of Figure 1, and shows the line-spacing mechanism in side elevation.

The line-spacing mechanism is shown in Figures 1 and 3 and operates as follows:

The shaft 20 carries a gear-wheel 81 which, through an idler wheel 82 drives a gear-wheel 83. A three-lobe cam 84 is secured to the gear-wheel 83 and thus rotates continuously on a stub shaft 85. An arm 86 is pivoted at 87 and is rocked three times in each cycle by the cam 84. A bell-crank lever 88 is secured to the arm 86 by a bridging piece 89 so that the horizontal arm of the lever 88 is moved down and then up three times in each cycle. A spring 90 causes the arm 86 to to follow the contour of the cam 84, and the extent to which the assembly 86, 88 rocks clockwise can be adjusted by means of a screw 91 screwed into the bridging piece 89 and engaging a stop 92.

The pawl 80 is pivoted on the end of an arm 93 and is spring-biased towards the ratchet-wheel 79. The arm 93 has a pin 94 engaging a slot in an arm 95 which is pivoted at 96. A link 97 is pivoted to the arm 95 at 98. The link 97 has a hook 99 adapted to be engaged by a hook 100 on the bell-crank lever 88 when the link 97 is moved to the right from the position shown in Figure 3. A spring 101 normally holds the link 97 in the position shown so that the bell-crank lever 88 can rock idly.

A pair of levers 102 are pivoted at 103 and are connected together by a rod 104 and an armature 105. The link 97 bears against the rod 104 so that the spring 101 normally holds the levers 102 in the position shown, with the armature 105 engaging an adjustable stop 106. When a line-space magnet SM is energized, it attracts its armature 105 and rocks the levers 102 about their pivot 103. The rod 104 moves to the right (Figure 3) so as to move the link 97 to the right with its hook 99 under the hook 100. At this time the bell-crank 88 is rocking counter-clockwise so that it will depress the link 97 to rock the arm 95 counter-clockwise and the arm 93 clockwise. The pawl 80 will thus feed the ratchet-wheel 79 through a tooth space. The ratchet-wheel 79 is thus turned clockwise and turns the planet carrier 72, 73, 74 clockwise also. The sun-wheel 77 is stationary at this time so that the compound gear-wheels 76 will roll over it and rotate about their own axes. Owing to the fact that the larger wheel in each compound gear meshes with the smaller sun-wheel 77, the extent of movement which is correct for true rolling movement between the larger wheel 76 and the sun-wheel 77 is too great for true rolling movement between the smaller wheel 76 and the sun-wheel 78. The sun-wheel 78 will therefore be turned clockwise to rotate the platen one line-space.

A justifying lever 107 is pivoted at 108 and has a pin 109 which rests in the space between the teeth of the ratchet-wheel 79. The function of this lever is to ensure that the ratchet-wheel comes to rest in one of a number of definite positions. It also serves to prevent backward movement of the ratchet-wheel 79 during long-feed operations. It will be seen that the arrangement avoids any risk of the platen coming to rest after a long-feed operation with the ratchet-wheel in such a position that the justifying pin rests on top of one of its teeth as might be the case if the ratchet-wheel and the platen were secured together as is the usual practice. Consequently, there is no risk of the platen being turned half a line space or one and a half line spaces in the line-spacing operation that follows a long-feed operation.

Figure 2:
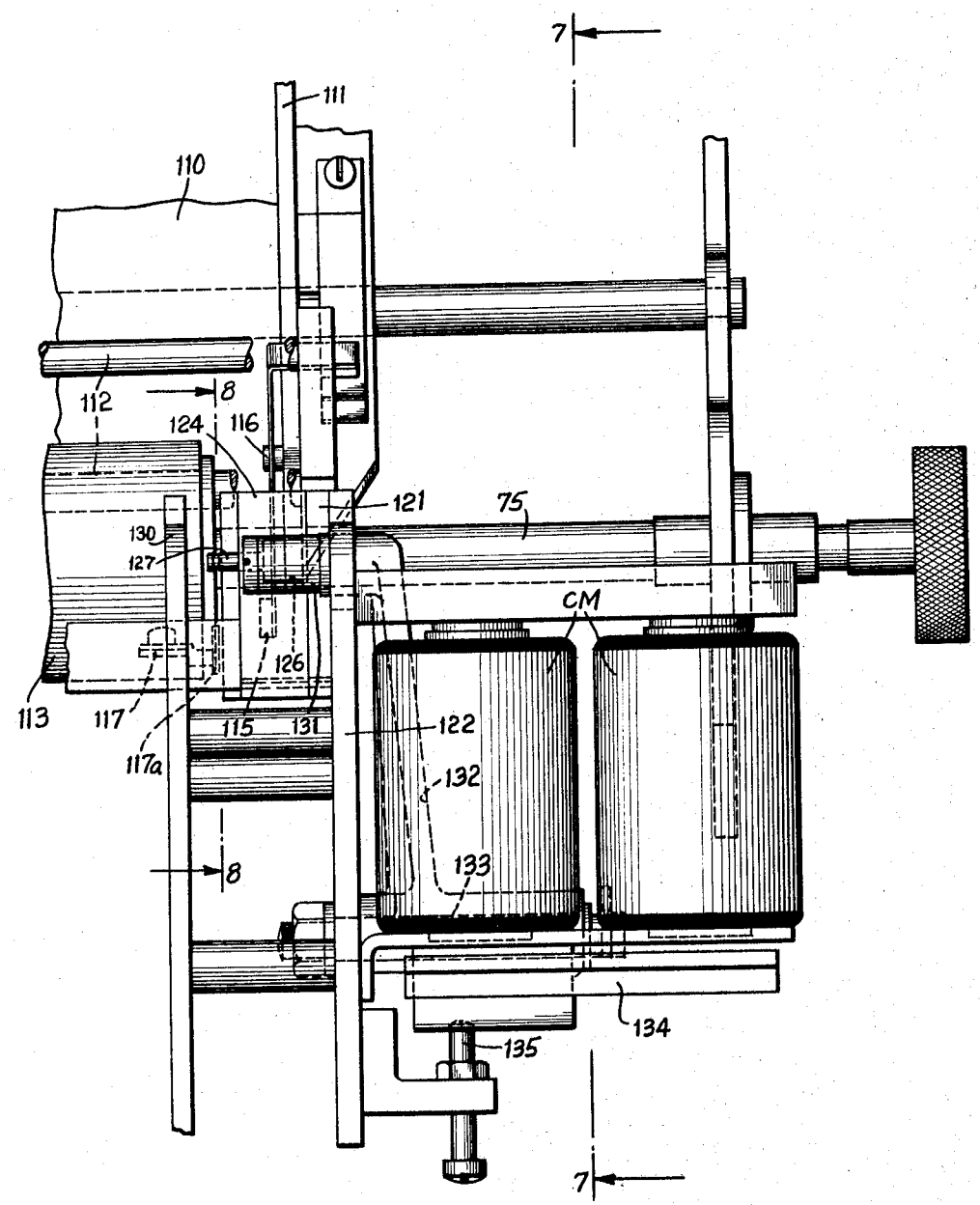
Figure 2 is a front elevation at the right-hand end of the platen showing punching means for punching a rectangular portion from one margin of a sheet that is fed by the platen.

Referring to Figures 2, 7 and 8, the ledger sheet is placed on a tray 110 face downwards and with its right-hand margin against a guide 111. The leading, upper, edge of the sheet is then fed between usual guides supported on cross-rods 112 into a bite between the platen 113 and pressure rollers 114. As will be apparent hereinafter, the platen will be rotating at this time so that the sheet will be fed forwardly at a relatively high speed. As previously mentioned, the sheet has a step 19 (Figure 11) in its right-hand margin. When this step reaches the end of a lever 115, it rocks the lever about its pivot 116 and the lever closes a pair of contacts LF. These contacts control the energization of the magnet LFC to bring the platen to rest when the first blank line is at the printing position. The printing line is at the position indicated by the arrow X in Figure 8, and it will be observed that the printing line is a considerable distance away from the end of the lever 115 so that, if the contacts LF were arranged to interrupt the rotation of the platen immediately after they closed, it would be necessary to place the step a considerable distance below the lowest blank line, with the result that the lower part of the sheet could not be used. It is to avoid this difficulty that the platen is arranged to turn to a predetermined extent after the energization of the magnet LFC as a result of the closure of the contacts LF.

It will be noticed from Figure 11 that the ledger sheet has step 19 cut in both its margins. The distance of these steps from the top of the sheet corresponds to the amount of the sheet allocated to receive a pre-printed heading, and these steps are cut during the manufacture of the sheets. When the ledger sheet contains no entries but has merely the pre-printed heading, the step 19 will serve to bring the sheet to rest with its first line at the printing position.

As the leading edge of the ledger sheet enters between the platen 113 and the feed rollers 114, it engages the end 117a of a lever 117 and rocks this lever about its pivot 118 to close contacts PL. The end 117a of the lever is located opposite a reduced part of the platen and engages a portion of the sheet lying inside the part of the sheet in which the steps are formed. The contacts PL will thus be closed when the leading margin of the sheet reaches the end 117a of the lever and will only re-open when the trailing margin of the sheet has passed the end 117a of the lever. The function of these contacts is to control the machine when printing has been effected on the last line of a ledger sheet without a total having been printed.

The right-hand margin of the sheet extends beyond the right-hand edge of the platen and into a slot 119 (Figure 8) in a punch-die 120. The die comprises a plate 121 (Figures 2 and 7) secured to a frame-plate 122 of the machine and two blocks 123 and 124 (Figure 8). The blocks 123 and 124 are spaced apart to provide the slot 119, and are formed with slots on their rear faces, as seen in Figure 8, which slots are closed by the plate 121 and form a square passage 125 in which a rectangular punch 126 slides. A pin 127 is secured to the punch 126 and extends through a slot 128 in the block 124. A spring 129 is connected between the pin 127 and a frame plate 130 and serves to bias the punch 126 to the left against a roller 131.

The roller 131 is carried by an arm 132 which is pivoted on a stud 133 carried by the plate 122. An armature 134 is formed integral with the arm 132 and normally rests on an adjustable stop 135. When a cutting magnet CM is energized, it attracts the armature 134 and rocks the lever 132 clockwise (as seen in Figure 7) so as to move the punch 126 to the right (Figure 7) and cut a rectangular piece of paper from the margin of the sheet. This cutting operation lowers the step 19 to an extent equal to one line-space so that the step 19 is always level with the highest blank line on the sheet.

The sequence of operations in feeding ledger sheet will now be explained with reference to Figure 9.

The main switch of the machine is first closed to connect main lines 140 and 141 to a source of supply. The tabulating motor is connected directly between these lines and will thus rotate. Switches SW1 and SW2 are closed and a switch SW3 is opened to render the ledger sheet feeding mechanism operative. A circuit is completed immediately from the line 140 through the switch SW1, a relay LFR2, normally closed contacts LFR1—B and the contacts C1 which are normally closed. The relay LFR2 closes its contacts LFR2—B in parallel with the contacts LFR1—B.

It should be explained that cam contacts designated L or P and a suffix operate in all listing or all totaling cycles, respectively. Cam contacts designated T and a suffix operate only in card-feed cycles: all the "line-finding" relays provided with the sheet feed mechanism are designated LFR and a suffix.

The start key is next depressed to close start key contacts ST and complete a circuit from the line 140 through relay coils R1 and R2, the contacts ST, stop key contacts SP1 and cam contacts L2 which close in each cycle of the machine. The relay R2 closes its contacts R2—A to provide a holding circuit for itself and the relay R1 through cam contacts L1 which are normally closed but which open, for a short time near the end of each cycle of the machine. The relay RI closes its contacts RI—C to complete a circuit from the line 140 through a card-feeding clutch magnet CFC, a relay R4, normally closed "sub-total" relay contacts STR—B, normally closed contacts R25—A, the contacts RI—C and contacts L3. The magnet CFC engages the usual card-feeding clutch so that a card-feeding operation takes place. The coil R4 closes its contacts R4—B to provide a holding circuit for the magnet CFC through the contacts L3.

During the first cycle the first card is fed to the upper brushes UB and causes the closure of the usual upper card lever contacts UCLC which energize relay coils R7 and R8. The coil R8 closes its contacts R8—B to provide a holding circuit including cam contacts L4 which are closed where the gaps between the cards are passing the card lever. The coils R7 and R8 will thus remain energized so long as cards continue to feed.

During the first card-feeding cycle the contacts R2—C are closed so that a circuit could be completed from the line 140 through relays LFR10 and LFR3, cam contacts P10a, contacts LFR9—A of a relay LFR9, relay contacts MIR10, a plug connection 199 and the contacts R2—C closed by the coil R2. The coil LFR3 closes its contacts LFR3—C to maintain itself and the coil LFR10 energized. The coil LFR10 opens its contacts LFR10—A in shunt with the start key contacts ST. The cam for contacts P10 operates in all cycles. Thus in the first cycle, the contacts P10 will close and complete a circuit including the magnet PFC, the contacts P10, the contacts LFR3—C and the contacts C1. The long-feed mechanism will then come into action and will rotate the platen.

The cam contacts L1 open at the end of the first cycle to de-energize the relays R1 and R2. The start key must again be depressed to re-energize the relays R1 and R2 so that a second card-feed cycle follows. The relays R1 and R2 will again be deenergized when the contacts L1 open. The first card is fed to the lower brushes LB and closes card lever contacts LCLC to energize relay coils LFR9, R9, R10 and R11. The coil R11 closes its contacts R11—B to hold these coils energized over the gaps between the cards. These coils thus remain energized until the last card has passed the lower brushes.

The coil LFR9 opens its contacts LFR9—A so that the circuit previously traced to the coils LFR10 and LFR3 cannot again be completed. The platen is now rotating but the machine is otherwise idle. The first ledger sheet is now inserted and closes the contacts PL as it feeds. These contacts complete a circuit to energize a relay LFR1 which opens its contacts LFR1—B, in circuit with the relay coil LFR2, and closes contacts LFR1—A and LFR1—C.

The ledger sheet is fed forward until the step in it engages and closes the contacts LF. A circuit is then completed through the magnet LFC, the contacts LF, the contacts LFR2—A and LFR3—A, which are now closed, and the contacts C1. The magnet LFC then engages the roller clutch so that the platen will come to rest after the pre-determined further movement and so that the contacts C1 will be open, the cam 58 (Figure 5) operating these contacts being driven through the roller clutch. The opening of the contacts C1 de-energizes the relays LFR2, LFR3 and LFR10 and also de-energizes the magnet LFC so that the only line-finding relay remaining energized is the relay LFR1.

The relays LFR3 and LFR10 being de-energized, their contacts LFR3—B and LFR10—A will be closed. Further, since the relay LFR1 is energized, its contacts LFR1—A and LFR1—C are closed. A circuit can therefore be completed from the line 140 through the relays R1 and R2, the switch SW2, the contacts LFR10—A, LFR1—C, SP1 and L2. The relays R1 and R2 are thus re-energized and a card-feeding cycle takes place. The relay R2 closes its contacts R2—A to provide a holding circuit for itself and the relay R1 through the contacts R2—A and the contacts L1 or the contacts R2—A, SP—2 and R25—B, the contacts R9—C and R7—A in parallel, an autostart switch AS which is in the position shown, and the contacts LFR1—A and LFR3—B. These circuits maintain the relays R1 and R2 energized until the contacts R25—B are opened.

The closure of the contacts R2—C does not result in the relays LFR10 and LFR3 being re-energized immediately since the contacts LFR9—A are opened by the coil LFR9 which was energized through the lower card lever contacts. The relay LFR10 and LFR3 are re-energized over a different circuit which will be explained later.

The cards are fed successively past the lower brushes and the amounts on each are read and added in an accumulator. These amounts may also be printed by printing mechanism in the usual manner.

The printing mechanism is called into action by engaging a clutch which is engaged when a print clutch magnet PC is energized. During card-feeding cycles this magnet is energized by a circuit extending through it, a relay coil R5, one of several pairs of contacts F1—A, relay contacts R4—C and relay contacts R10—A which close when the card reaches the lower brushes, relay contacts STR—B, relay contacts R25—A, the relay contacts R1—C, and cam contacts L3. This circuit can only be completed during card-feeding cycles and is dependent upon one of the contacts F1—A being closed. Each pair of these contacts is normally closed, but can be opened by an associated relay F1 when that relay is energized. Each of these relays F1 is associated with a separate printing bank, and when de-energized, conditions that bank to print amounts read by the lower brushes from the cards. If it is not desired that a particular bank should print, the related relay is plugged so that it will be energized during all card-feeding cycles.

A group designating number on each card is read by the lower brushes LB and is compared with the group number which is read from the following card by the upper brushes UB. This comparison is effected by the usual automatic group control mechanism which includes a relay coil R25 (Fig. 9) controlling the contacts R25—A and R25—B. At the bottom of Fig. 9 it is seen that relay R25 is one of the relays energized along with the minor control relay MI whenever there is a change in group. When the last card of the group passes the lower brushes, its group number will not agree with that on the following card and the automatic group control mechanism will operate, energizing the relay R25 which shifts the contacts R25—A and R25—B.

When the contacts R25—B shift, the circuit for the relays R1 and R2 extends from the line 140 through these relays, the contacts R2—A, the contacts SP—2, the contacts R25—B (lower) and an auto-reset switch AR which is in the position shown.

The contacts R25—A are shifted in order to interrupt the circuit to the feed clutch magnet CFC.

The machine will now perform a number of totalling cycles. The number of such cycles can be varied, as explained in British patent specification No. 422,135 aforesaid, in accordance with the type of operation required from the machine. It will be assumed that it is required to print a total obtained in an accumulator in the machine and then to reset that accumulator. This requires two cycles and the machine is adjusted so that a "cycle 2" relay C2R is energized when the automatic group control mechanism operates on a group change. This relay remains energized for a single cycle and energizes a "cycle 1" relay C1R just before the end of that cycle. The "cycle 1" relay C1R remains energized for one cycle and causes the resetting of the accumulator. The relay R25 is de-energized near the end of the latter cycle to allow of the resumption of card-feeding when the sheet-feed mechanism is properly conditioned.

In order to print the total registered in the accumulator by its related printing bank, the related relay F1 is plugged to a pair of contacts of the "cycle 2" relay C2R. The print bank relay will be energized in the proper totalling cycle to open its contacts F1—A and close its contacts F1—B. When energized, this relay also conditions its printing bank to print a total in the related accumulator. As the arrangement of the automatic group control cycle relays, accumulators and the printing mechanism are set forth in the Patent 2,174,699, they will not be described in greater detail here.

When the machine commences total printing cycles, the contacts R25—A shift, thus completing a circuit from the line 140 through a relay R6, the contacts R25—A, the contacts R1—C and the cam contacts L3 to the line 141. The relay R6 closes its contacts R6—B to hold itself energized over the contacts L3 and also closes its contacts R6—C so as to energize the magnet PC and the relay R5 in any total printing cycle in which one of the contacts F1—B is closed. From the above, it will be seen that the printing mechanism will operate in any cycle in which printing is required. Further, the relays R4 and R5 will be energized in any card-feeding cycle in which printing is required, while the relays R5 and R6 will be energized in any totalling cycle in which printing is required.

The control for the cutting and line spacing magnets will now be described.

If printing is taking place during a card-feeding cycle, relay contacts R4—A and R5—B will be closed. A circuit can now be completed from the line 140 through the switch SW1, the cutting magnet CM, cam contacts L12, cam contacts L11, the relay contacts R4—A (upper) and R5—B and lower card lever relay contacts R11—C. The cutting magnet is thus energized, and cuts a rectangle from the sheet to lower the step in the sheet. While the cam contacts L11 are still closed, the cam contacts L12 open and the cam contacts L12a close to complete a similar circuit through the line-space magnet SM. The sheet is thus line-spaced and this line-spacing operation occurs before printing is effected. The long-feed mechanism actually comes to rest with the last printed line in the printing position so that this line-spacing operation brings the first blank line into the printing position.

The cam contacts L11 open half way through the cycle, and the cam contacts L11a close. If a double-space switch DSS is opened, no further circuits will be completed and the sheet will be moved a single-line space in each listing operation. If this switch is closed, circuits may be completed first through the relay CM and the contacts L12 and then through the relay SM and the contacts L12a and these circuits include the contacts L11a, contacts R6—A (lower), the switch DSS, the contacts R5—B and R11—C. In this connection, it will be noted from Figure 10 that the contacts L12 shift twice in each cycle.

During totalling cycles, the contacts R4—A will be in the position shown, while the contacts R6—A will be shifted so that the circuits just traced cannot be completed. If it is desired to space the paper before printing a total so that the total will be printed in a line different than the last item line, a plug connection is made from a socket 200 to contacts C2—A. These contacts are closed by the "cycle 2" relay C2R during totalling cycle 2, which is the first of the two totalling cycles. Under these conditions, circuits to the magnets CM and SM will be completed through the contacts L12a, L11, R4—A (lower) and C2—A in the cycle in which total printing is effected so as to cut and space the paper before the total is actually printed.

If it is desired to double-space the paper, a socket 201 is plug-connected to the relay contacts C2—A as well as the socket 200. The relays CM and SM will then be energized twice before the total is printed. If it is desired to print the total in the same line as the last listed item, no plug connections are made from the sockets 200 and 201 so that the paper will not be spaced during totalling operations.

During the second of the two totalling cycles, namely cycle 1, a circuit is completed through the switch SW1, the relay coils LFR10 and LFR3, the cam contacts P10a, contacts C1—A of the "cycle 1" relay C1R, the contacts MiR10 which have now shifted under control of a minor group control relay when totaling, the plug connection 199 and the relay contacts R2—C. As previously explained, the energization of the relays LFR10 and LFR3 results in the paper feed clutch magnet PFC being energized so that a long paper feed operation is initiated. The ledger sheet will, therefore, be fed out. As it feeds out it will allow the contacts PL to open and de-energize the relay LFR1, which allows its contacts LFR1—B to close to re-energize the relay LFR2. The relay LFR3 opens its contacts LFR3—B to interrupt the circuit to the relays R1 and R2 so that card-feeding operations cannot be re-initiated while the ledger sheet is being ejected and the relay LFR10 opens its contacts LFR10—A to break the shunt around the start key contacts.

The machine is now in the same condition as it was before the first ledger sheet was inserted, and the insertion of the second ledger sheet will cause card-feeding operations to be resumed exactly as described previously. As soon as this sheet is inserted it will be fed forward, the long-feeding operation will be interrupted when the sheet is in the proper position and card-feeding operations will then be resumed automatically. The card-feeding operations will be followed by totalling operations and the automatic ejection of the ledger sheet.

It should be mentioned that the contacts LF will be closed when a sheet is ejected if it does not contain many lines of print. This would interrupt the long-feed operation before the sheet is ejected were it not for the relay LFR2 whose contacts LFR2—A are now open. The relay LFR2 was deenergized when the contacts C1 last opened and is not re-energized until the relay LFR1 is de-energized when the contacts PL open. By this time the contacts LF have also opened.

The above description was based on the assumption that the machine is to obtain minor totals only. If the machine is adjusted to obtain both major and minor totals, the plug connection 199 may be made to connect the major contacts MaR10 in circuit instead of the minor contacts MiR10. If the plugging is thus altered the circuit through the relay coils LFR10 and LFR3 will not be made on a minor group change which is not accompanied by a major group change, since the major contacts MaR10 only shift on a major group change. The ledger sheet will thus be fed out only on a major group change. Minor totals will thus be printed and card-feeding will be automatically resumed in the usual manner when the relay R25 is de-energized during cycle 1. Both contacts MaR10 and MiR10 may be plugged to the contacts R2—C so that the ledger sheet is fed out on either a major or minor group change.

If a sheet already contains a large number of printed lines, the number of lines to be printed under the control of a group of cards may be greater than the sheet can accommodate. The paper-feeding operation which brings the lowest line of the sheet to the printing position, will have fed the sheet sufficiently far for its trailing margin to have passed the lever 117 (Figure 7). The contacts PL (Figure 9) will therefore open and de-energize the relay LFR1. In consequence, the contacts LFR1—A and LFR1—C will re-open and will interrupt the circuit to the relays R1 and R2. This prevents any further card-feeding operations.

Under these conditions, after card feeding is stopped, the operator closes a sub-total switch STS momentarily so as to complete a circuit from the line 140 through a relay LFR5, sub-total relay STR, the switch STS, cam contacts P7, the contacts R2—A and cam contacts L1. The sub-total relay adjusts the machine to print a sub-total, that is, to print the total without resetting the accumulator. The sub-total relay also closes its contacts STR—A to provide a holding circuit for itself including cam contacts P5 and normally closed contacts R1—B in parallel so that it and the relay LFR5 is maintained energized. The relay LFR5 also closes its contacts LFR5—A and LFR5—B.

The start key is now depressed momentarily to complete a circuit through the contacts L2, the contacts SP—1, the contacts ST and the relays R1 and R2. The contacts LFR1—A are open so that the holding circuit for the relay coils R1 and R2 will extend through the cam contacts L1 and these relay coils will only be energized for a single cycle. The relay coil R1 shifts its contacts R1—C to complete a circuit through the contacts STR—B (now shifted by the sub-total relay STR) and the relay coil R6. The coil R6 closes its contacts R6—C to complete a circuit through the line 141, contacts L3, R1—C, the left R25—A contacts, the right contacts STR—B, R6—C and LFR5—B, relay R5, the print clutch magnet PC and line 140. The sub-total will now be printed because relay STR is still energized and the addition of a resetting complement is prevented while taking the total. The relay R1 opens its contacts R1—B so that the relays LFR5 and STR are deenergized when the cam contacts P5 open at the end of this cycle. The relay R2 closes its contacts R2—C so that a circuit is completed through the relays LFR10 and LFR3, the contacts P10a, the contacts LFR5—A and the contacts R2—C. The energization of these relays results in the ejection of the ledger sheet.

From Figure 10 it will be noticed that the contacts P10a are normally closed. The contacts P10 close at "12" in the cycle, that is, after the total has been printed. The magnet PFC is, thus, not energized and the sheet is not ejected, until after the total has been printed. A new ledger sheet may now be inserted and card-feeding operations will automatically be resumed in the now familiar way.

If the contacts PL open in the cycle in which the last card of a group is read, the relay R25 will be energized and the relays R1 and R2 will be held energized over a circuit including these relays, the contacts R2—A, SP—2 and R25—B (lower) and the switch AR. The totalling cycles will therefore take place and the sheet will be ejected automatically and in the same manner as when the contacts PL were closed.

The group number on each card may be printed opposite the amount read from that card by connecting sockets 202 to sockets 203 of the appropriate lower brushes. This permits circuits to be completed from the line 140 through print magnets PR, relay contacts F1—C, the sockets 202, the sockets 203, the lower brushes LB, contacts R10—C, cam contacts T6, and impulse distributing contacts CB and the line 141.

At the same time that information is printed from one card, the group number of the following card can be printed. Thus, when the information is printed from the last card of the group, the group number of the next card, that is, the first card of the next group, is also printed so that the operator of the machine can verify that he is inserting the correct ledger sheet corresponding to the group which is about to be read. For this purpose, three of the print magnets PR may be connected to the upper brushes UB. Since the upper brushes are connected to the line 140 it is necessary to connect the return from these magnets to the line 141 instead of to the line 140. This is effected by setting a "pre-indicating" switch PIS to the full line position shown in Figure 9. Plug connections are also made from sockets 204 to sockets 205 and from sockets 206 to sockets 207. Further, sockets 208 are plug-connected to the sockets 202 associated with the magnets PR that print the group number of the card at the lower brushes. Thus, circuits can be completed through the upper brushes reading the group number, the sockets 205, the sockets 204, either of the relay coils LFR6, LFR7 or LFR8, print magnets PR, the switch PIS, relay contacts R10—C and the contacts T6 and CB. This will cause the printing of the group number of the card passing at the upper brushes at the same time as the group number of the card passing the lower brushes is printed.

The relay coils LFR6, LFR7 and LFR8 close their contacts LFR6—B, LFR7—B and LFR8—B to provide parallel circuits through the sockets 206, 207, automatic control magnets CM', the sockets 208, 202 and 203 and the lower brushes.

These circuits are the usual automatic control circuits customarily employed in Hollerith machines and their function need not therefore be described in detail. It may be stated briefly that the completion of these circuits determines the operation of the automatic group control mechanism to continue card-feeding or initiate totalling cycles according to whether or not the last card of the group has passed the lower brushes. The magnets PR just referred to belong to a printing bank which is not associated with an accumulator nor used for total printing.

While the disclosure shows and described the fundamental novel features of the invention, it will be understood that various omissions, substitutions and changes in the form and details of the illustrated device and in its operation, may be made by those skilled in the art without departing from the spirit of the invention. Therefore, it is intended that the invention be comprehended as indicated by the scope of the following claims.

What is claimed is:

1. In a machine for feeding record sheets, a roller for feeding said sheet, epicyclic gearing comprising three gear members, one of which is connected to said roller, a ratchet wheel connected to the second of said gear members, a line spacing mechanism for operating said ratchet wheel, a long space feeding mechanism attached to the third gear member, and a brake cooperating with said third gear member for holding it while the line spacing mechanism operates the roller by means of the second gear member and the ratchet.

2. In a machine for feeding ledger sheets, a platen around which said sheet is fed, epicyclic gearing comprising a driving sun gear, planet gears and a driven sun gear, said driven sun gear being attached to said platen, a line spacing element attached to said planet gears, line spacing mechanism cooperating with said element to feed the sheet, long feeding insertion and ejection mechanism connected to said driving sun gear for feeding the sheet through spaces greater than a line space, and a brake in constant cooperation with said long feed mechanism for holding it while line spacing takes place.

3. In a machine for feeding record sheets, means for placing feed control indicia on said sheet, a platen holding said sheet, feeding means for operating said platen, a main operating means, epicyclic gearing between said main operating means and said feeding means with a driving gear member connected to said operating means and a driven gear member connected to said feeding means, a third gear member between the other two members for governing their driving connection, means for arresting said third member to cause operation of said feeding means, means for sensing said indicia, and means under control of said sensing means for disconnecting said arresting means from said third member to terminate operation of said feeding means when said sheet is properly positioned as determined by said indicia.

4. In a machine for printing and feeding ledger sheets under control of record cards arranged in groups, said sheets receiving recordings of one or more items at different times and being reinserted for recording separate groups of items, means for sensing the data on said cards, means under control of said sensing means for controlling the recording of lines of printing on said sheets, means for placing progressively advanced feed control indicia on a sheet as line after line of data is recorded thereon, a holder for said sheet, means for line spacing said sheet, long-feed means for reinserting said sheet, means operatively connected to said holder and through which the line spacing and long feeding means operate the holder to feed and reinsert the sheet, a main operating means, epicyclic gearing between said main operating means and said long-feed means with a driving gear member connected to said main operating means and a driven gear member connected to said feeding means, a third gear member between the other two members for governing their driving connection, means for arresting said third member to cause operation of said feeding means, means for sensing the extent to which said indicia are advanced, and means under control of said sensing means for disconnecting said arresting means from said third member to stop operation of said feeding means to position said ledger sheet to receive a line of recording directly under the last recorded line, and means for reengaging said arresting means with said third member to cause operation of said long-feed means to eject the sheet after receiving the final line of recording.

5. In a machine for printing and feeding ledger sheets under control of record cards, said sheets receiving recordings of one or more items at different times and being reinserted for recording separate groups of items, means for feeding said cards, means for sensing the data on said cards, means under control of said sensing means for controlling the recording of lines of printing on said sheets, a holder for one of said sheets, means for line spacing said sheet, means for detecting the appearance of the leading edge of a ledger sheet, long-feed means under control of said detecting means for reinserting a sheet to a position wherein recording may be resumed, means operatively connected to said holder and through which the line spacing and long feeding means operate the holder to feed and reinsert the sheet, and means under control of said detecting means for initiating operation of said card feeding means.

6. In a machine for printing and feeding ledger sheets under control of record cards, said sheets receiving recordings of one or more items at different times and being reinserted for recording separate groups of items, means for feeding said cards, means for sensing the data on said cards, means under control of said sensing means for controlling the recording of lines of printing on said sheets, a holder for one of said sheets, means for line spacing said sheet, means for detecting the appearance of the leading edge of a ledger sheet, long-feed means under control of said detecting means for reinserting a sheet to a position wherein recording may be resumed, means operatively connected to said holder and through which the line spacing and long feeding means operate the holder to feed and reinsert the sheet, and means under control of said detecting means for initiating operation of said card feeding means, means for cutting a progressively lowered shoulder on said sheet as line printing and line spacing takes place, means under control of said shoulder for controlling said long-feed means to stop its operation after the sheet is reinserted to a position wherein printing follows directly under previously recorded printing, means for operating said long-feed means to eject the sheet, and means under control of said shoulder controlled means for stopping operation of said card feeding means when the trailing edge of the ejected sheet is sensed thereby.

7. In a machine for printing and feeding ledger sheets under control of record cards, means for feeding said cards, means for sensing the data on said cards, means under control of said sensing means for controlling the recording of lines of printing on said sheets, a holder for one of said sheets, means for line spacing said sheet, long-feed means for inserting said sheet into the machine and moving it relative to said recording control means, said long-feed means also operating to eject said sheet from the holder after recording is completed, means operatively connected to said holder and through which the line spacing and long-feed means operate the holder to space and feed the sheet relative to the recording control means, means for sensing the end of the sheet, means under control of said sheet end sensing means for interrupting the operation of said card feeding means when recording is effected on the lowest line on said sheet, and manually operable means for initiating operation of said long-feed mechanism to eject the sheet.

8. In a machine for printing and feeding ledger sheets under control of record cards, means for feeding said cards, means for sensing the data on said cards, means under control of said sensing means for controlling the recording of lines of printing on said sheets, a holder for one of said sheets, means for line spacing said sheet, long-feed means for inserting said sheet into the machine and moving it relative to said recording control means, said long-feed means also operating to eject said sheet from the holder after recording is completed, means operatively connected to said holder and through which the line spacing and long-feed means operate the holder to space and feed the sheet relative to the recording control means, means for sensing the end of the sheet, means under control of said sheet end sensing means for interrupting the operation of said card feeding means when recording is effected on the lowest line on said sheet, and manually operable means for initiating operation of said long-feed mechanism to eject the sheet, and means under control of said manually operable means for controlling recording of data at the bottom of said sheet before ejecting the sheet.

HAROLD HALL KEEN.